United States Patent
Hsu

(10) Patent No.: US 7,173,964 B2
(45) Date of Patent: Feb. 6, 2007

(54) METHOD FOR DETECTING DATA TRANSMISSION RATE OF USB CONTROLLER BY USING USB DEVICE

(75) Inventor: Hung-Chou Hsu, Hsin-Tien (TW)

(73) Assignee: Via Technologies, Inc., Hsin-Tien (TW)

( * ) Notice: Subject to any disclaimer, the term of this patent is extended or adjusted under 35 U.S.C. 154(b) by 753 days.

(21) Appl. No.: 10/263,751

(22) Filed: Oct. 4, 2002

(65) Prior Publication Data

US 2003/0223486 A1 Dec. 4, 2003

(30) Foreign Application Priority Data

May 29, 2002 (TW) .............................. 91111398 A

(51) Int. Cl.
*H04Q 1/18* (2006.01)
*G06F 13/00* (2006.01)
(52) U.S. Cl. ...................... 375/225; 710/305
(58) Field of Classification Search ............... 375/224, 375/225, 259; 710/305
See application file for complete search history.

(56) References Cited

U.S. PATENT DOCUMENTS

| | | | | |
|---|---|---|---|---|
| 5,012,223 | A | * | 4/1991 | Griebell et al. ............. 340/531 |
| 6,862,258 | B2 | * | 3/2005 | Kitagawa ................... 369/53.3 |
| 6,938,103 | B2 | * | 8/2005 | Azzarito et al. ............... 710/6 |
| 2003/0163627 | A1 | * | 8/2003 | Deng et al. ................. 710/305 |

* cited by examiner

*Primary Examiner*—Kevin Burd
(74) *Attorney, Agent, or Firm*—Rosenberg, Klein & Lee

(57) ABSTRACT

A method is provided for detecting the data transmission rate of a USB controller by using a USB device having at least one program storage device. An IRQ signal of a timer is activated through a program. If the USB controller transmits a signal corresponding to a high-speed USB controller within a pre-determined period of time, the data transmission rate is set to a high-speed mode. If the signal is not detected, data transmission is set to a full-speed mode.

9 Claims, 3 Drawing Sheets

METHOD FOR DETECTING DATA TRANSMISSION RATE OF USB CONTROLLER BY USING USB DEVICE

BACKGROUND OF THE INVENTION

1. Field of the Invention

The present invention generally relates to a method for detecting data transmission rate and more particularly, to a method for detecting the data transmission rate of a USB controller by using a USB device, characterized in that a program storage device is installed in the USB device to detect whether the USB controller of a computer connected thereto responds a signal corresponding to a high-speed USB controller within a pre-determined period of time, thereby determining whether the host supports a high-speed transmission mode, so as to efficiently complete detecting the data transmission rate of the host controller with a minimum number of programs.

2. Description of the Prior Art

In recent years, with the rapid development in the information industry, people have increasing needs for a higher operation speed as well as a higher data transmission rate of information products. Universal Serial Bus (USB) technology according to the conventional USB standard (USB 1.1) has become insufficient in many aspects.

The advantages of the USB standard include compatibility with "Plug-And-Play" (PNP), ability in connecting up to 127 different peripheral devices on the bus at a time and 5-V power supply while only one interruption request (IRQ) is required. The conventional USB standard 1.1 has received a great deal of attention from those designing computer peripherals as of late, no one has heretofore thought to use it as an interface for an image processing system. This is primarily because the USB standard 1.1 provides a low-speed transmission rate of 1.5 Mbps and a full-speed transmission rate of 12 Mbps, both of which, however, are orders of magnitude slower than the 133 MBps PCI bus. Accordingly, USB 1.1 is not believed to be fast enough to support the data flow requirements of an image processing system.

Even though a new USB standard (USB 2.0) has recently been proposed to reach a higher data transmission rate of 480 Mbps, however, most of the peripheral devices still operate according to USB 1.1. Therefore, there is need in developing a solution to the compatibility between these specifications and it has become an important issue to identify the data transmission rate of a host controller for supporting its peripheral USB devices.

A conventional method for identifying the transmission rate of a peripheral USB device for a USB controller is shown in FIG. 1. To start with, detect whether the peripheral USB device connected to the host controller is a low-speed device or not (step 101). If yes, data is transmitted in a low-speed mode (step 121); if not, it is believed that the peripheral device can receive data transmitted at least in a full-speed mode, and the procedure proceeds detecting whether the peripheral device is a high-speed device. Meanwhile, the (USB) controller of the host delivers a SEO signal (step 103), and then detects whether a K signal is received within 3 ms (step 105). If not, is it believed that the peripheral device is a full-speed device and thus the host controller transmits data in a full-speed mode (step 125); if yes, a chirp sequence is then performed so as to determine whether the peripheral device is a high-speed device (step 107). Then, the chirp sequence is detecting to be completed or not (step 109). If not, the host controller transmits data in a full-speed mode (step 125); if yes, it is thus believed that the peripheral device is a high-speed USB device and thus the host controller transmits data to the peripheral device in a high-speed mode (step 111).

By using the fore-mentioned method, a high-speed USB controller can identify the data transmission rate of a peripheral USB device connected thereto. However, the high-speed USB device also has to meet the specification of the conventional USB 1.1 for broadening its application field. Thus, here comes the problem for the high-speed USB device to detect whether the USB controller in a computer is a high-speed USB controller or a full-speed USB controller.

Therefore, there is need in providing a method for detecting the data transmission rate of the USB controller for a high-speed peripheral USB device, for simplifying the detecting procedure and minimized the number of required programs.

SUMMARY OF THE INVENTION

Accordingly, it is the object of the present invention to provide a method for detecting data transmission rate of a USB controller by using a USB device, in which a program storage device is installed in a USB device to store programs for detecting the data transmission rate of the host controller.

It is another object of the present invention to provide a method for detecting data transmission rate of a USB controller by using a USB device, in which a minimum number of programs are employed to complete detecting the data transmission rate of the host controller.

It is still another object of the present invention to provide a method for detecting data transmission rate of a USB controller by using a USB device, in which a transmission rate identifying flag is employed to mark the result.

In order to achieve the foregoing objects, the present invention provides a method for a USB device to detect data transmission rate of a USB controller, comprising steps of: activating an IRQ signal of a timer by using a program; detecting whether said host controller transmits a K signal in response to the IRQ signal within a pre-determined period of time; if not, setting data transmission in a full-speed mode; if yes, detecting whether said host controller transmits a J signal within said pre-determined period of time; if not, setting data transmission in said full-speed mode; if yes, repeating the detection of K and J signals for two times; if completed, setting data transmission in a high-speed mode; otherwise, setting data transmission in a full-speed mode.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing a method for detecting the transmission rate of a USB controller by using a USB device can be exemplified by the preferred embodiments as described hereinafter.

Figure 1:
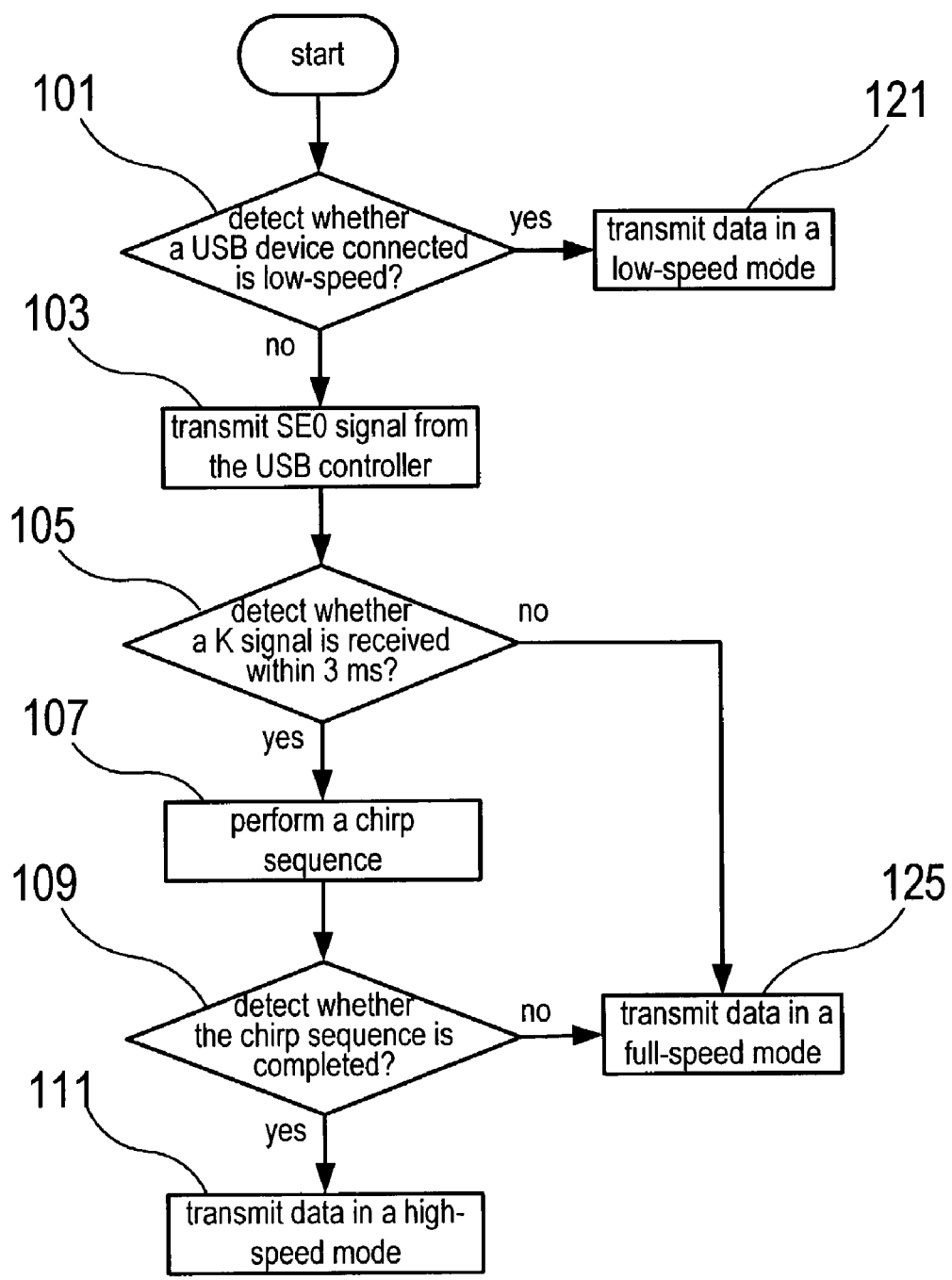
FIG. 1 is a flow chart schematically illustrating a conventional method for detecting the data transmission rate of a USB device in accordance with the prior art.
Figure 2:
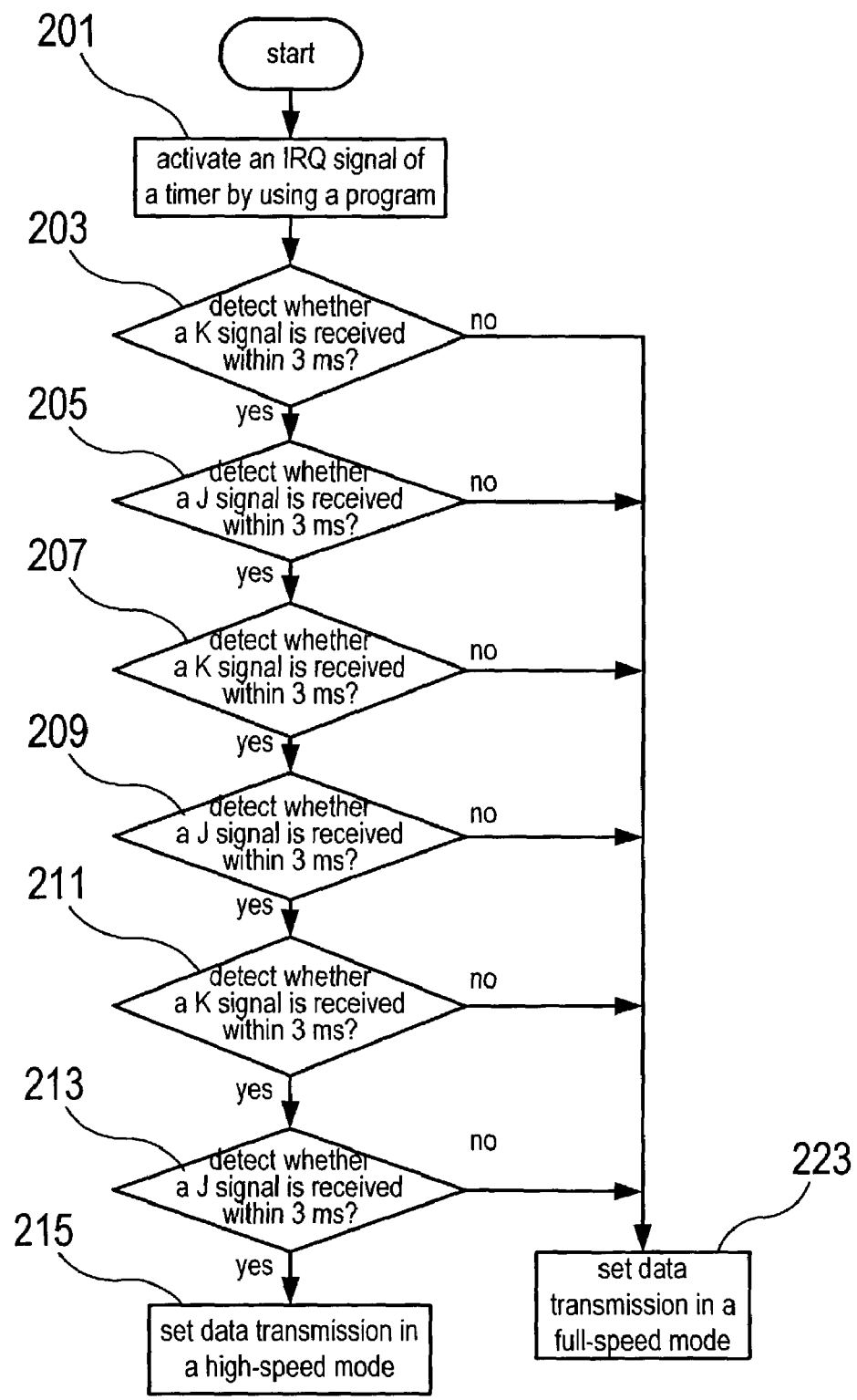
FIG. 2 is a flow chart schematically illustrating a method for detecting the data transmission rate of a USB controller in accordance with one preferred embodiment of the present invention.

To start with, please refer to FIG. 2, which is a flow chart schematically illustrating a method for detecting data transmission rate of a USB controller in accordance with one preferred embodiment of the present invention. In the present embodiment, while a high-speed USB device is connected to a host, such as a computer or a USB hub, the USB device activates an IRQ (interrupt request) signal of a timer by using a program (step 201). Then, a USB controller of the host resets to transmit a SEO signal to the USB device. Since the USB device is a high-speed USB device, therefore it transmits a K signal to the USB controller of the host after receiving the SEO signal. According to the high-speed USB specification, the USB controller of the host has to transmit a K signal and a J signal to said USB device at least three times to assure that the controller is a high-speed USB controller. Accordingly, the procedure proceeds detecting whether the USB controller transmits a K signal within 3 ms (step 203). If yes, the procedure proceeds detecting whether said USB controller transmits a J signal within 3 ms (step 205). If yes, the procedure proceeds detecting whether the USB controller transmits a K signal within 3 ms (step 207). If yes, the procedure proceeds detecting whether the USB controller transmits a J signal within 3 ms (step 209). If yes, the procedure proceeds detecting whether the USB controller transmits a K signal within 3 ms (step 211). If yes, the procedure proceeds detecting whether the USB controller transmits a J signal within 3 ms (step 213). If yes, it is believed that the USB controller is a high-speed USB controller and therefore data is transmitted in a high-speed mode (step 215). If one of the above steps (step 203 to step 213) result in a result of "no", it is thus believed that the USB controller does not support the high-speed transmission mode and therefore data is transmitted in a full-speed mode (step 223).

In the present embodiment, only a few loop detecting statements of software are required to determine data transmission rate of the USB controller. Thus, the amount of programs, the procedures and time for detecting are greatly reduced.

Figure 3:
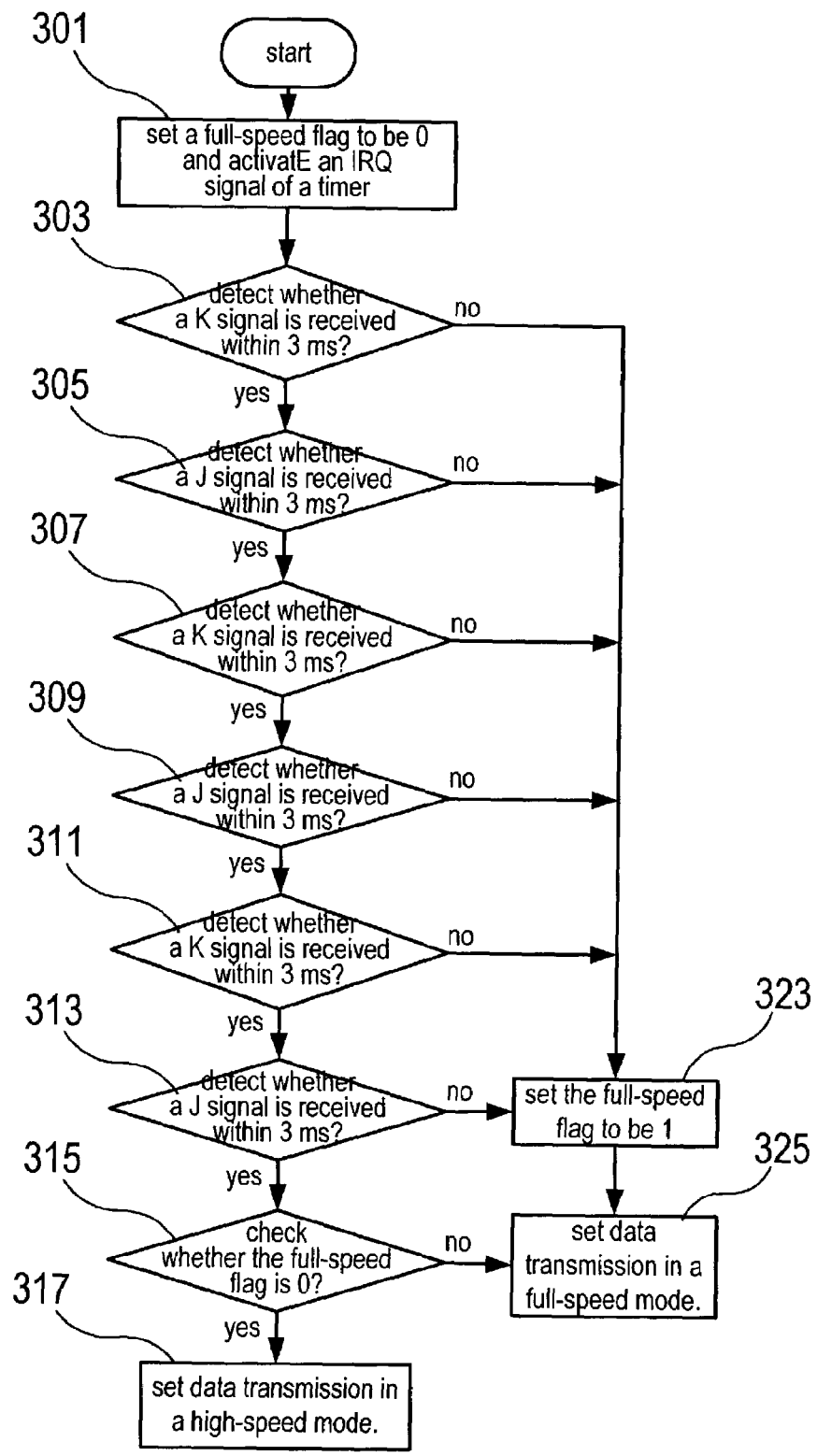
FIG. 3 is a flow chart schematically illustrating a method for detecting data transmission rate of a USB controller in accordance with another preferred embodiment of the present invention.

Please further refer to FIG. 3, which is a flow chart schematically illustrating a method for detecting data transmission rate of a USB controller in accordance with another preferred embodiment of the present invention. As described in the present embodiment, a transmission rate identifying flag, such as a full-speed flag, is employed to determine data transmission rate of the USB controller. The procedure starts with setting the full-speed flag to be zero before activating said IRQ signal (step 301). Then, a USB controller of the host resets to transmit a SEO signal to the USB device. The USB device transmits a K signal to the USB controller of the host. The procedure proceeds detecting whether the USB controller transmits a K signal to the USB device within 3 ms (step 303). If yes, the procedure proceeds detecting whether said USB controller transmits a J signal within 3 ms (step 305). If yes, the procedure proceeds detecting whether the USB controller transmits a K signal within 3 ms (step 307). If yes, the procedure proceeds detecting whether the USB controller transmits a J signal within 3 ms (step 309). If yes, the procedure proceeds detecting whether the USB controller transmits a K signal within 3 ms (step 311). If yes, the procedure proceeds detecting whether the USB controller transmits a J signal within 3 ms (step 313). If one of the above steps (step 303 to step 313) result in a result of "no", it is thus believed that the USB controller does not support the high-speed transmission mode and therefore the full-speed flag is set as "1" (step 323) and data is transmitted in a full-speed mode (step 325). If step 313 results in a result of "yes", in order to make sure that the detection is not interfered, the procedure proceeds with step 315 to detect whether the full-speed flag is set as "0". If yes, the detection is not interfered and it is believed that the USB controller is a high-speed USB controller, therefore data is transmitted in a high-speed mode. If not, data transmission rate is set in a full-speed mode (step 325). In this manner, we can confirm that the detection is not interfered, and the double check process is easily performed.

In both the two embodiments, a detecting program stored in the program storage device installed in the high-speed USB device is utilized to complete the procedure. The full-speed flag in the embodiment shown in FIG. 3 can be stored in the program storage device or in a column in a register, in which "0" denotes a high-speed transmission mode and "1" denotes a full-speed transmission mode. Furthermore, the program storage device can be implemented by using a memory and, therefore various modifications can be made by those skilled in this art.

According to the above discussion, it is apparent that the present invention discloses a method for detecting the transmission rate of a USB controller by using a USB device, characterized in that a program storage device is installed in the USB device to detect whether the USB controller of a host connected thereto transmits signals corresponding to a high-speed USB controller within a pre-determined period of time, thereby determining whether the USB controller supports a high-speed transmission mode, so as to efficiently complete detecting the data transmission rate of the USB controller with a minimum number of programs. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for detecting data transmission rate of a Universal Serial Bus (USB) controller by using a USB device having at least one program storage device, said method comprising:
   executing a detecting program stored in said program storage device, the detecting program including the steps of:
   a. activating a timer via an interrupt request signal;
   b. setting a data transmission rate of said USB device in a full-speed mode upon a failure to detect a USB chirp K signal transmitted from said USB controller within a pre-determined period of time;

c. if said USB chirp K signal transmitted from said USB controller is detected within said pre-determined period of time, setting said data transmission rate of said USB device in a full-speed mode upon a failure to detect a USB chirp J signal within said pre-determined period of time;

d. if said USB chirp J signal transmitted from said USB controller is detected within said pre-determined period of time, repeating the method at steps b and c twice; and e. setting said data transmission rate of said USB device in a high-speed mode if said data transmission rate is not set in said full-speed mode.

2. The method as claimed in claim 1, wherein said program storage device comprises a transmission rate identifying flag.

3. The method as claimed in claim 2, further comprising a step a0 before said step a:

setting said transmission rate identifying flag to be zero.

4. The method as claimed in claim 3, wherein said step of setting said data transmission rate of said USB device in a full-speed mode is preceded by the step of setting said transmission rate identifying flag to one in step b and said step c.

5. The method as claimed in claim 4, further comprising a step d1 after said step d:

examining whether said transmission rate identifying flag is in said full-speed mode; if yes, setting data transmission rate of said USB device in said full speed mode.

6. A method for detecting data transmission rate of a Universal Serial Bus (USB) controller by using a USB device having at least one program storage device, said method comprising:

executing a detecting program stored in said program storage device including the steps of:

activating a timer via an interrupt request signal;

detecting whether said USB controller transmits each of a sequence of signals corresponding to a high-speed USB controller within a pre-determined period of time and setting a transmission rate identifying flag followed by setting a data transmission rate of said USB device to a full-speed mode upon a failure to detect a USB chirp K signal transmitted from said USB controller within said pre-determined period of time;

if said USB chirp K signal transmitted from said USB controller is detected within said pre-determined period of time, setting a transmission rate identifying flag followed by setting said data transmission rate of said USB device in a full-speed mode upon a failure to detect a USB chirp J signal within said pre-determined period of time; and setting said data transmission rate of said USB device in a high-speed mode if all of said sequence of signals are each respectively detected within said pre-determined period of time.

7. The method as claimed in claim 6, wherein said pre-determined period of time is 3.0 ms.

8. The method as claimed in claim 6, wherein said sequence of signals corresponding to said high-speed USB controller is a USB chirp K signal followed by a USB chirp J signal repeated in succession to form a USB chirp sequence KJKJKJ.

9. A method for detecting data transmission rate of a Universal Serial Bus (USB) controller by using a USB device having at least one program storage device, said method comprising steps of:

executing a detecting program in said program storage device including the steps of:

setting a transmission rate identifying flag to indicate a high-speed mode before transmitting an interrupt request signal;

detecting whether said USB controller transmits each of a sequence of USB chirp signals corresponding to said high-speed USB controller responsive to said interrupt request signal within a pre-determined period of time;

setting said transmission rate identifying flag to indicate a full-speed mode followed by setting a data transmission rate of said USB device to a full-speed mode upon a failure to detect a USB chirp K signal transmitted from said USB controller within said pre-determined period of time;

if said USB chirp K signal transmitted from said USB controller is detected within said pre-determined period of time, setting a transmission rate identifying flag followed by setting said data transmission rate of said USB device in a full-speed mode upon a failure to detect a USB chirp J signal within said pre-determined period of time; and if said entire sequence of USB chirp signals is detected within said predetermined period of time, setting said data transmission rate of said USB device according to said transmission rate identifying flag.

* * * * *